United States Patent [19]

Colman et al.

[11] Patent Number: 4,810,382

[45] Date of Patent: Mar. 7, 1989

[54] CYCLONE SEPARATOR

[75] Inventors: Derek A. Colman, Fleet; Martin T. Thew, South Hampton, both of United Kingdom

[73] Assignee: B.W.N. Vortoil Rights Co. Pty. Ltd., Dandenong, Australia

[21] Appl. No.: 44,364

[22] PCT Filed: Jun. 17, 1986

[86] PCT No.: PCT/AU86/00174

§ 371 Date: Mar. 2, 1987

§ 102(e) Date: Mar. 2, 1987

[87] PCT Pub. No.: WO86/07549

PCT Pub. Date: Dec. 31, 1986

[30] Foreign Application Priority Data

Jun. 17, 1985 [GB] United Kingdom ............... 8515263

[51] Int. Cl.[4] .......................................... B01D 17/038
[52] U.S. Cl. ................................. 210/512.1; 209/144; 209/211
[58] Field of Search ................... 210/512.1; 209/211, 209/144

[56] References Cited

U.S. PATENT DOCUMENTS 4,097,375 6/1978 Molitor .................. 209/211

Primary Examiner—Frank Sever
Attorney, Agent, or Firm—Ladas & Parry

[57] ABSTRACT

This invention is about a cyclone separator, and may be applied to the cyclone separators disclosed and claimed in UK Pat. Nos. 1583742, 1583730 or 2102311, or those described in UK Patent Application 8419771 or 8511149 or 8515264. Thus, application 8419771 describes a cyclone separator which has an inlet portion having generally the form of a volume of revolution with a single tangential inlet (preferably with an involute feed channel, for introducing feed to be separated into the cyclone separator and, adjacent to the inlet portion and substantially coaxial therewith, a generally axially symmetrical separation portion converging uninterruptedly into a downstream portion. The inlet portion has an axial overflow outlet opposite the separation portion (i.e. in its end wall). The involute feed channel may be fed from a duct directed tangentially into the inlet portion, the (outer) wall of the channel converging to the principal diameter of the inlet portion, preferably by substantially equal radial decrements per unit angle around the axis, preferably attaining the principal diameter after 360° around the axis.

9 Claims, 1 Drawing Sheet

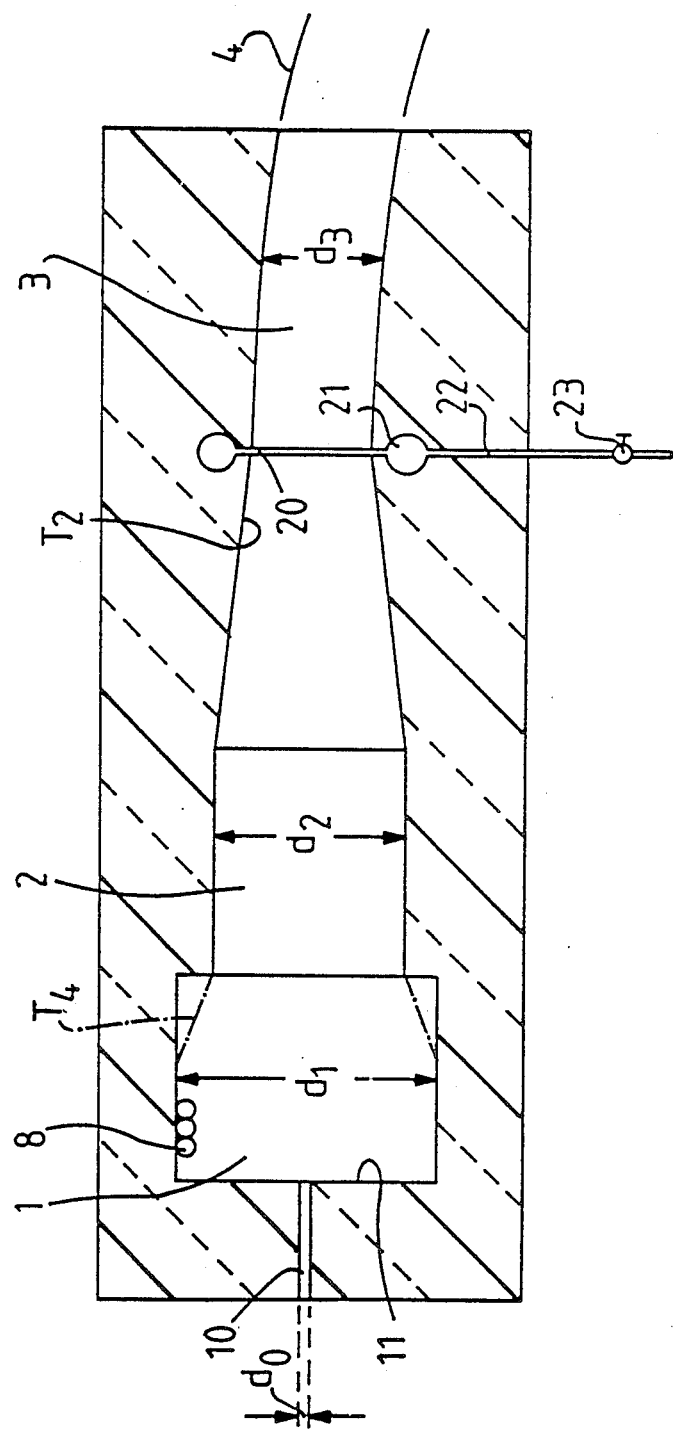

CYCLONE SEPARATOR

Application 8511149 describes a cyclone separator which has an inlet portion having generally the form of a volume of revolution with a single inlet (preferably tangential, and preferably with an inwards spiralling feed channel such as an involute entry) for introducing feed to be separated into the cyclone separator and, adjacent to the inlet portion and substantially coaxial therewith, a generally axially symmetrical separation portion converging (preferably uninterruptedly) into a downstream portion. The inlet portion has an axial overflow outlet opposite the separation portion (i.e. in its end wall). In the cyclone separator, the following relationships (i)-(v) apply: where $d_1$ is the diameter of the cyclone in the inlet portion where flow enters (but neglecting any feed channel), $d_i$ is twice the radius at which flow enters the cyclone (i.e. twice the minimum distance of the tangential component of inlet centreline from the axis), $A_i$ is the cross-sectional area of the inlet at entry to the cyclone in a plane parallel to the axis of the cyclone and perpendicular to the component of the inlet centreline not parallel to the cyclone axis, $d_2$ is the diameter of the cyclone where the inlet portion joins the separation portion the point of junction being defined as being at the axial position $z_2$ (measured away from the inlet plane) where the condition first applies that:

$$\tan^{-1}\left(\frac{d_2 - d}{2(z - z_2)}\right) < 2°$$

for all $z > z_2$ where d is the cyclone diameter at z, $d_3$ is the cyclone diameter where the separation portion joins the downstream section and is defined as the diameter at $z_3$ where $d/d_3 \geq 0.98$ for all $z \geq z_3$, $d_o$ is the minimum internal diameter of the axial overflow outlet, then:

$$3 < \frac{\pi d_2 d_i}{4 A_i} \leq 12 \quad \text{(i)}$$

$$20' < \alpha < 2° \quad \text{(ii)}$$

where $\alpha$ is the half angle of convergence of the separation portion, i.e.

$$\alpha = \tan^{-1}\left(\frac{d_2 - d_3}{2(z_3 - z_2)}\right)$$

$$d_o/d_2 < 0.2 \quad \text{(iii)}$$

$$0.9\, d_1 > d_2 \quad \text{(iv)}$$

$$0.9\, d_2 > d_3. \quad \text{(v)}$$

The cyclone separator of application 8515264 has an inlet portion having generally the form of a volume of revolution with n inlets where $n > 1$ (each inlet preferably tangential, and preferably with an inwards spiralling feed channel such as an involute entry) for introducing feed to be separated into the cyclone separator and, adjacent to the inlet portion and substantially coaxial therewith, a generally axially symmetrical separation portion converging (preferably uninterruptedly) into a downstream portion. Where the feed channels do not spiral inwards, or where they are not axially staggered, at least part of the generator of the inlet portion and/or of the separation portion is curved. The inlet portion has an axial overflow outlet opposite the separation portion (i.e. in its end surface) In the cyclone separator, the following relationships (i)-(v) apply: where $d_1$ is the diameter of the cyclone inlet portion. where flow enters (but neglecting any feed channel), $d_{ix}$ is twice the radius at which flow enters the cyclone through the x-th inlet (i.e. twice the minimum distance of the tangential component of inlet centreline from the axis), and $$d_i = \frac{1}{A_i} \sum_{x=1}^{x=n} d_{ix} A_{ix},$$

$A_{ix}$ is the total cross-sectional area of the x-th inlet measured at entry to the cyclone in a plane parallel to the axis of the cyclone and perpendicular to the component of the inlet centreline not parallel to the cyclone axis, $$A_i = \sum_{x=1}^{n} A_{1x},$$

$d_i$ is the diameter of the cyclone where the inlet portion joins the separation portion the point of junction being defined as being at the axial position $z_2$ (measured away from the inlet plane where $z=0$) where the condition first applies that:

$$\tan^{-1}\left(\frac{d_2 - d}{2(z - z_2)}\right) < 2°$$

for all $z > z_2$ where d is the cyclone diameter at z, $z = 0$ being the position of the axial centroid of the inlets, $d_3$ is the cyclone diameter where the separation portion joins the downstream section and is defined as the diameter at $z_3$ where $d/d_3 > 0.98$ for all $z > z_3$, $d_o$ is the minimum internal diameter of the axial overflow outlet, then:

$$3 \leq \frac{\pi d_2 d_i}{4 A_i} \leq 12 \quad \text{(i)}$$

$$20' < \alpha < 2° \quad \text{(ii)}$$

where $\alpha$ is the half angle of convergence of the separation portion, i.e.

$$\alpha = \tan^{-1}\left(\frac{d_2 - d_3}{2(z_3 - z_2)}\right)$$

$$d_o/d_2 < 0.2 \quad \text{(iii)}$$

$$0.9\, d_1 > d_2 \quad \text{(iv)}$$

$$0.9\, d_2 > d_3. \quad \text{(v)}$$

In those cyclone separators in use, the major volumetric component is the continuous phase, with up to a few percent of less dense phase and with perhaps up to about 1 part per thousand by volume finely divided solids or other more dense phase. Priority is usually given to a highly purified continuous phase over minimising the volume of the outlet stream containing the less dense phase. Both features, while typical of use of the cyclone separators set forth above, are most unlike the vast majority of cyclone separator technology.

The drawing shows the best mode of the invention.

According to one aspect of the present invention there is provided a cyclone separator comprising a separating chamber; at least one inlet for introducing feed to be separated into the cyclone separator and at least two outlets for discharging material from the separating chamber at least one slot disposed in the wall of said separating chamber downstream of the or each said inlet said slot leading to or communicating with an exit from said separating chamber.

Preferably the or each slot is generally circumferential and extends at least partially around the wall of said separating chamber. In one form two slots are dhsposed on the same circumferential line in spaced apart relation. In another form the slot extends continuously around the wall of the separating chamber.

There may be further provided a valve to control the discharge of material from said exit so that a selected proportion of the material flowing through the chamber leaves through that exit.

Preferably up to 15% by volume of the material leaves through said exit.

Preferably the slot extends radially outwardly with substantially planar edges and free from radially inwardly extending protusions into the body of the cyclone separator.

In one form the separating chamber comprises at least a primary portion having generally the form of a volume of revolution and having a first end and a second end, the diameter at said second end being less than the diameter at said first end said single inlet having at least a tangential component and being disposed at or adjacent said first end for introducing feed to be separated into the cyclone separator in which cyclone separator the following relationship applies: where $d_i$ is the diameter of the cyclone in the primary portion where flow enters (but neglecting any feed channel), $d_i$ is twice the radius at which flow enters the cyclone (i.e. twice the minimum distance of the tangential component of the inlet centre line from the axis), $A_i$ is the cross-sectional area of the inlet at entry to the cyclone in a plan parallel to the axis of the cyclone and perpendicular to the component of the inlet centre line not parallel to the cyclone axis, $d_2$ is the diameter of the primary portion at said second end and is measured at a point $z_2$ where the condition first applies that:

$$\tan^{-1}\left(\frac{d_2 - d}{2(z - z_2)}\right) < 2°$$

for all z greater than $z_2$ is the distance along the cyclone separator axis downstream of the plane containing the inlet and d is the diameter of the cyclone at z then:

$$\frac{\pi d_2 d_i}{4 A_i}$$

is from 3 to 12.

In another form the separating chamber comprises at least a primary portion having generally the form of a volume of revolution and having a first end and a second end, the diameter at said second end being less than at said first end, a plurality of n inlets, where n>1, each said inlet having at least a tangential component at or adjacent said first end for introducing feed to be separated into the cyclone separator and the separator further including at least two outlets, in which cyclone separator the following relationship applies:

where d is the diameter of the said primary portion where flow enters (but neglecting any feed channel), $d_{ix}$ is twice the radius at which flow enters the cyclone through the $x^{th}$ inlet (i.e. twice the minimum distance of the tangential component of the inlet centre line from the axes) and $$d_i = \frac{1}{A_i} \sum_{x=1}^{n} d_{ix} A_{ix}$$

where $A_{ix}$ is the total cross sectional area of the $x^{th}$ inlet at entry to the cyclone separator in a plane parallel to the axis of the cyclone separator and perpendicular to the component of the inlet centre line not parallel to the cyclone axis, and where $$A_i = \sum_{x=1}^{x=n} A_{ix}$$

and where $d_1$ is the diameter of the primary portion at said second end and is measured at a point $z_2$ where the condition first applies that $$\tan^{-1}\left(\frac{d_2 - d}{d(z - z_2)}\right) < 2°$$

for all $z > z_2$ where z is the distance along the cyclone separator axis downstream of the plane containing the inlet and d is the diameter of the cyclone at z, and further z=0 being the axial position of the weighted areas of the inlets such that the injection of angular momentum into the cyclone separator is equally distributed axially about said axial position where z=0 and being defined by $$\frac{1}{A_i d_i} \sum_{x=1}^{x=n} z_x A_{ix} d_{ix} = 0$$

where $z_x$ is the axial position of the $x^{th}$ inlet and further $$\frac{\pi d_2 d_i}{4 A_i}$$

is from 3 to 12.

According to another aspect of the invention there is provided a method of separating a material containing (i) a volumetrically predominant continuous phase, (ii) a dispersed phase less dense than phase (i), and (iii) a dispersed phase more dense than phase (i), comprising applying the material to the inlet(s), phase (ii) predominantly reporting to an axially disposed one of said outlets and phase (iii) predominantly reporting to the exit through the slot.

Thus in the present invention, there is provided; a separating chamber; at least one inlet for introducing feed to be separated into the cyclone separator and at least two outlets for discharging material from the separating chamber; at least one generally circumferential slot disposed in the wall of said separating chamber downstream of the or each said inlet said slot leading to or communicating with an exit from said separating chamber. Preferably a valve is provided to control the exit, so that a desired proportion (such as up to 15% by volume) of the material flowing through the cyclone leaves through that exit. The slot is preferably not wider (measured axially) than 10% of $d_2$. Preferably the slot extends radially outwardly, with substantially planar edges, and free from radially inwards protrusions into the body of the cyclone separator.

Preferably higher pressure is applied at the inlets than exists, at the outlets and further it is preferable that the axial outlet is an overflow outlet.

Preferably, the dispersed phase (ii) is under 5% by volume (more preferably under 1%) of the material, and may for example be hydrophobic such as oil.

For example the phase (i) is aqueous.

For example the phase (iii) is solids, preferably not exceeding 1 part per thousand by volume of the material and may be example be sand, quartz or clay. Preferably its kinetic energy on leaving the cyclone separator is recovered.

The invention will now be described by way of example, with reference to the accompanying drawing, which shows, schematically, a cyclone separator according to the invention The drawing is not to scale.

Except as explained hereafter, the illustrated cyclone separator is identical to that disclosed and claimed in UK Pat. No. 2102311, to which the reader is referred. Identical reference numbers have been used as far as possible. Where the flow-smoothing taper $T_2$ of the separation portion 2 merges at its downstream end with the cylindrical third portion 3, a circumferential slot 20 is cut, leading to an annular gallery 21 which has occasional generally radial drains 22 controlled by valves 23. The slot width (measured axially) is 3 mm, i.e. about 8% of the diameter $d_2$ (38 mm) of the separation portion 2. $d_3$ is 19 mm.

In treating oily water, the oil removal efficiency remained satisfactory over a large range of split ratios at small volumetric flow rates through the slot 20, i.e. up to about 15% of the flow entering the cyclone separator. When the valves 23 were fully closed, the cyclone separator operated as if the slot 20 were absent.

The slot itself could be located anywhere along the taper $T_2$ where the flow was generally convergent. In a curved-wall cyclone, this would also apply, that is, the slot 20 could be located at any location where the flow structure was characteristic of a convergence towards the downstream outlet.

Slot widths grossly exceeding 10% of $d_2$ or having radially inwardly protruding lips, guides or other discontinuities were found to upset the flow structure in the cyclone separator.

The effect of the slot 20, when the valves 23 are appropriately open, is to form a third exit from the cyclone separator. This is especially suitable where it is desired to treat a continuous liquid phase (e.g. water) containing two low-concentration dispersed phases, one denser and one less dense than the continuous phase, e.g. solids and oil The solids may in practice comprise sand (e.g. quartz) or clay or chalk, up to about 1 part per thousand by volume. It is this denser phase which, centrifugally thrown radially outwardly towards the wall of the cyclone separator, is extracted through the slot 20. The particle size of such solids, in two examples 20 microns and 100 microns; these simply move into the slot. Some particles may be carried past the slot by the flow, but this is acceptable since, for most applications, removal of say three-quarters of the solids is sufficient.

Within the scope of this invention, the slot 20 may be applied to other cyclone separators than that in the drawing. Thus, for example, the slot 20 could be applied to the cyclone separator disclosed and claimed in UK Pat. No. 1583742, making it possible to treat materials containing higher proportions of less dense phase, such as up to 5%.

More than one slot 20 may be provided at different axial positions ($z > z_2$).

The slot(s) thus permit a three-way separation of material at similar energy cost as conventional two-way separation in a cyclone separator. The pressure drop in the slotted cyclone separator is similar to that in an unslotted one, and the need for extra energy-consuming sand-removal cyclones, as used conventionally, is obviated. Moreover, the kinetic energy may (at least to some extent) be recovered from the exit, by using a suitable form of spiral or tangential connection instead of exactly radial drains 22 from the slot 20; alternatively a diffusing action in the slot 20 itself may be exploited to recover this energy.

We claim:

1. A cyclone separator comprising a separating chamber;

at least one inlet for introducing feed to be separated into the cyclone separator and at least two outlets for discharging material from the separating chamber;

means for enabling a denser phase to exit the cyclone separator other than through said outlets, and for otherwise substantially precluding disturbance of the flow of material being discharged from the separating chamber, said means including at least one slot disposed in the wall of said separating chamber downstream of the or each said inlet, said slot leading to or communicating with an exit from said separating chamber.

2. A cyclone separator according to claim 1 wherein the or each said slot is generally circumferential and extends at least partically around the wall of said separating chamber.

3. A cyclone separator according to claim 2 wherein two said slots are disposed on the same circumferential line in spaced apart relation.

4. A cyclone separator according to claim 2 wherein said slot extends continuously around the wall of said separating chamber.

5. A cyclone separator according to claim 2 wherein up to 15% by volume of the material leaves through said exit.

6. A cyclone separator according to claim 1 further including a valve to control the discharge of material from said exit so that a selected proportion of the material flowing through the chamber leaves through that exit.

7. A cyclone separator according to claim 1 wherein said slot extends radially outwardly with substantially planar edges and free from radially inwardly extending protusions into the body of the cyclone separator.

8. A cyclone separator according to claim 1 wherein said separating chamber comprises at least a primary portion having generally the form of a volume of revolution and having a first end and a second end, the diameter at said second end being less than the diameter at said first end said single inlet having at least a tangential component and being disposed at or adjacent said first end for introducing feed to be separated into the cyclone separator in which cyclone separator the following relationship applies: where $d_i$ is the diameter of the cyclone in the primary portion where flow enters (but neglecting any feed channel), $d_i$ is twice the radius at which flow enters the cyclone (i.e. twice the minimum distance of the tangential component of the inlet centre line from the axis), $A_i$ is the cross-sectional area of the inlet at entry to the cyclone in a plan parallel to the axis of the cyclone and perpendicular to the component of the inlet centre line not parallel to the cyclone axis $d_2$ is the diameter of the primary portion at said second end and is measured at a point $z_2$ where the condition first applies that:

$$\tan^{-1}\left(\frac{d_2 - d}{2(z - z_2)}\right) < 2°$$

for all z greater than $z_2$ where z is the distance along the cyclone separator axis downstream of the plane containing the inlet and d is the diameter of the cyclone at z then:

$$\frac{\pi d_2 d_i}{4 A_i}$$

is from 3 to 12.

9. A cyclone separator according to claim 1 wherein said separating chamber comprises at least a primary portion having generally the form of a volume of revolution and having a first end and a second end the diameter at said second end being less than at said first end, a plurality of n inlets, where $n > 1$ each said inlet having at least a tangential component at or adjacent said first end for introducing feed to be separated into the cyclone separator and the separator further including at least two outlets, in which cyclone separator the following relationship applies:

where $d_1$ is the diameter of the said primary portion where flow enters (but neglecting any feed channel), $d_{ix}$ is twice the radius at which flow enters the cyclone through the $x^{th}$ inlet (i.e. twice the minimum distance of the tangential component of the inlet center line from the axes) and $$d_i = \frac{1}{A_i} \sum_{x=1}^{x=n} d_{ix} A_{ix}$$

where $A_{ix}$ is the total cross sectional area of the $x^{th}$ inlet at entry to the cyclone separator in a plane parallel to the axis of the cyclone separator and perpendicular to the component of the inlet centre line not parallel to the cyclone axis, and where $$A_i \sum_{x=1}^{x=n} A_{ix}$$

and where $d_2$ is the diameter of the primary portion at said second end and is measured at a point $z_2$ where the condition first applies that $$\tan^{-1}\left(\frac{d_2 - d}{2(z - z_2)}\right) < 2°$$

for all $z > z_2$ where z is the distance along the cyclone separator axis downstream of the plane containing the inlet and d is the diameter of the cyclone at z, and further $z = 0$ being the axial position of the weighted areas of the inlets such that the injection of angular momentum into the cyclone separator is equally distributed axially about said axial position where $z = 0$ and being defined by where $z_x$ is the axial position of the $x^{th}$ inlet, and further $$\frac{\pi d_2 d_i}{4 A_i}$$

is from 3 to 12.

* * * * *

UNITED STATES PATENT AND TRADEMARK OFFICE
CERTIFICATE OF CORRECTION

PATENT NO. : 4,810,382
DATED : March 7, 1989
INVENTOR(S) : DEREK A. COLMAN and MARTIN T. THEW It is certified that error appears in the above-identified patent and that said Letters Patent is hereby corrected as shown below:

Column 8, after line 32, please insert the following formula:

$$-- \frac{1}{A_i d_i} \sum_{x=1}^{x=n} z_x \quad A_{ix} \quad d_{ix} = 0 \quad --.$$

Signed and Sealed this

Nineteenth Day of September, 1989

*Attest:*

DONALD J. QUIGG

*Attesting Officer*  *Commissioner of Patents and Trademarks*